United States Patent [19]

Ramsey

[11] 3,949,514

[45] Apr. 13, 1976

[54] SNARE

[76] Inventor: Frank J. Ramsey, P.O. Box 394, Stephenville, Tex. 76401

[22] Filed: July 1, 1975

[21] Appl. No.: 592,330

[52] U.S. Cl. .................................... 43/87; 119/153
[51] Int. Cl.² ....................................... A01M 23/34
[58] Field of Search .................... 43/87, 5; 119/153; 294/19 R

[56] References Cited
UNITED STATES PATENTS

| | | | |
|---|---|---|---|
| 2,616,123 | 11/1952 | Armstrong | 43/87 |
| 3,540,769 | 11/1970 | Rosser | 119/153 |

*Primary Examiner*—Warner H. Camp

[57] ABSTRACT

A spring operated, trigger released snare for catching fish, frogs, snakes and other small animals includes a hand held pole having an intermediate barrel section, a handle section at one end and a head section at the other end. A snare wire extends through the barrel of the pole and forms a loop which projects from the head section where one end of the wire is fixed. The other end of the wire is secured to a spring biased piston which is slidably mounted in a piston chamber within the handle section of the pole. The piston includes a rearward extension which is normally projected beyond the end of the handle section by the spring actuator when the snare is tripped. The snare is cocked, or set, by pushing the rearward piston extension in until it is latched in a cocked position by a spring biased trigger. The cocking of the snare pushes the snare wire toward the head section to expand the snare loop so that it can be engaged over a small animal. Upon actuation of the trigger, the spring biased piston moves in a direction opposite to the head section and draws the snare loop tight about the animal.

7 Claims, 7 Drawing Figures

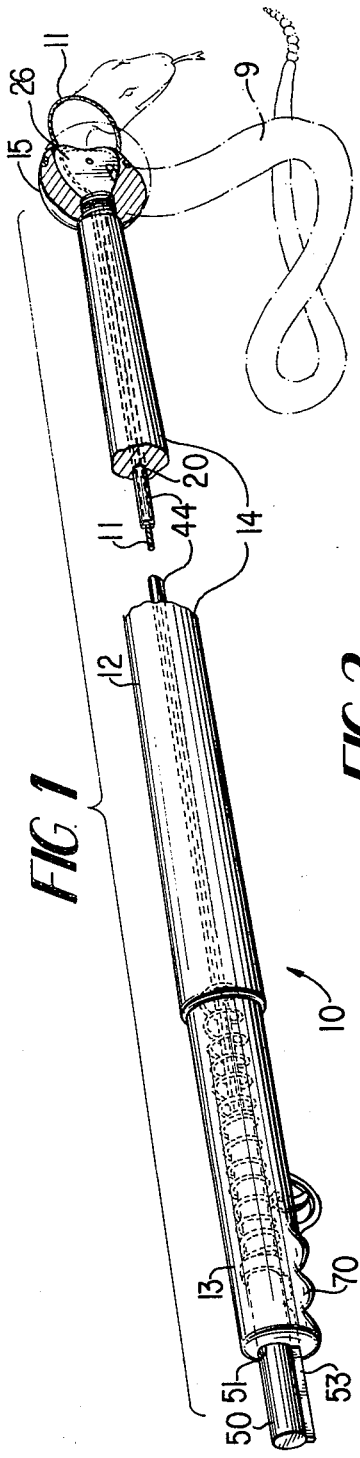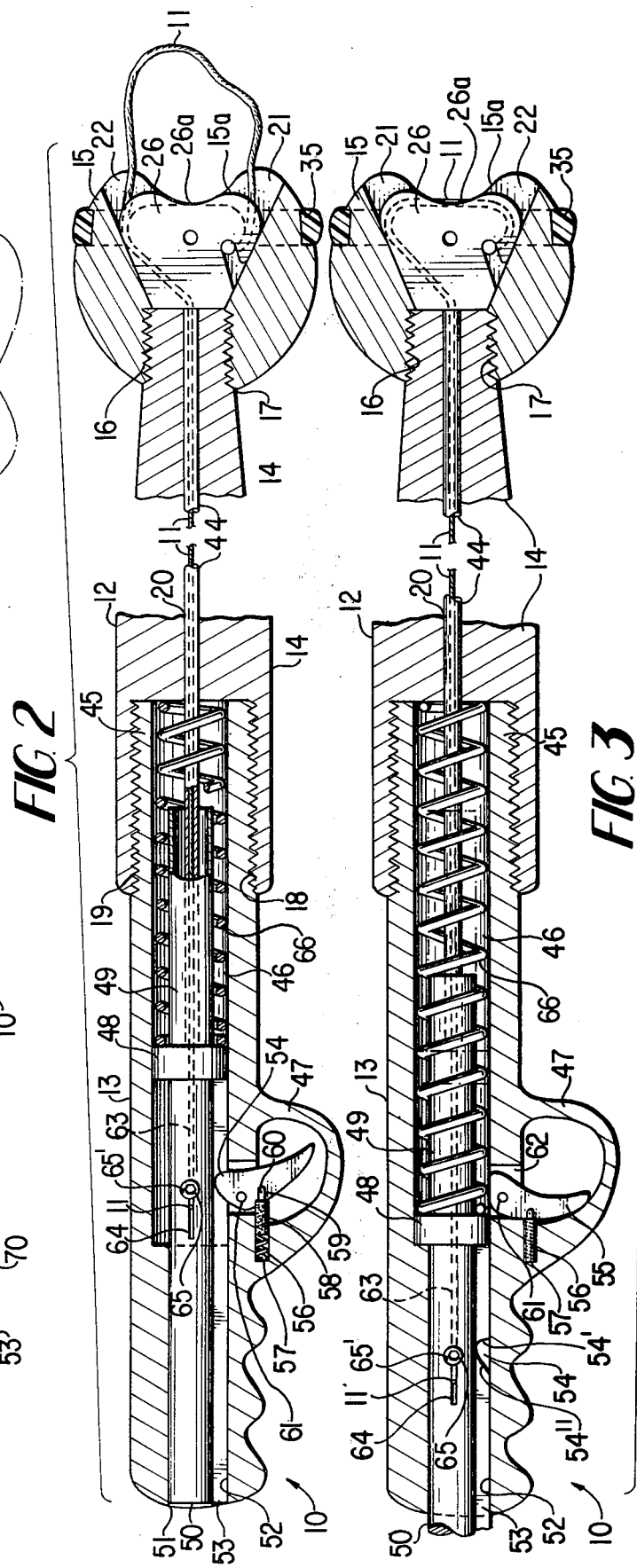

SNARE

This invention relates to a hand held, pole mounted spring actuated snare for catching fish, frogs, snakes and other small animals.

It is an object of the invention to provide a hand held, pole mounted snare for catching fish, frogs, reptiles and other small animals without danger to the person holding the snare of being bitten or clawed.

It is another object of the invention to provide a snare which is spring operable to close the snare about an animal upon actuation of a trigger and which is manually cocked to open the snare and hold the snare latched in the open position until the trigger is released.

It is another object of the invention to provide a snare which may be used to retrieve fish from fish traps and to transfer them to other storage areas without the operator being finned.

BRIEF DESCRIPTION OF THE DRAWING

With the foregoing more important objects and features in view and such other objects and features which may become apparent as this specification proceeds, the invention will be understood from the following description taken in conjunction with the accompanying drawings in which like characters of reference are used to designate like parts, and in which:

FIG. 1 is a perspective view of the invention which is partially broken away, showing the invention in use for snaring a snake;

FIG. 2 is a longitudinal partial sectional view of the invention in the cocked position with the snare open;

FIG. 3 is a view similar to FIG. 2, but with the snare closed;

DESCRIPTION OF THE PREFERRED EMBODIMENT

Figure 4:
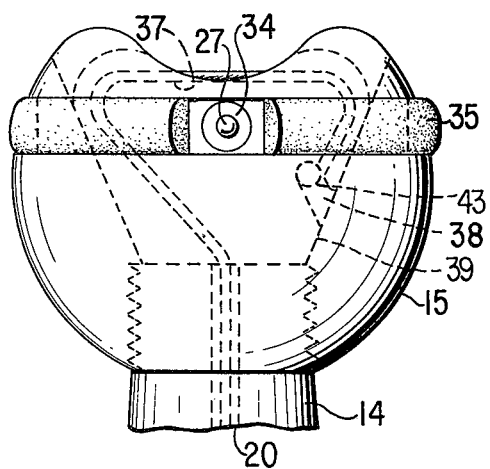
FIG. 4 is an elevational view of the head end of the invention.
Figure 5:
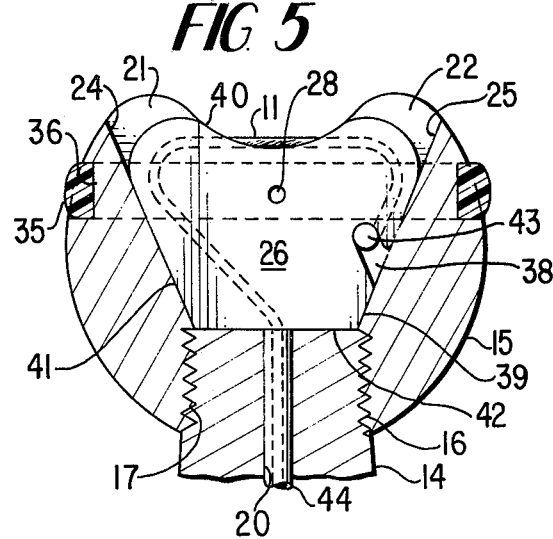
FIG. 5 is a sectional view of the invention taken on line 5—5 of FIG. 6.
Figure 6:
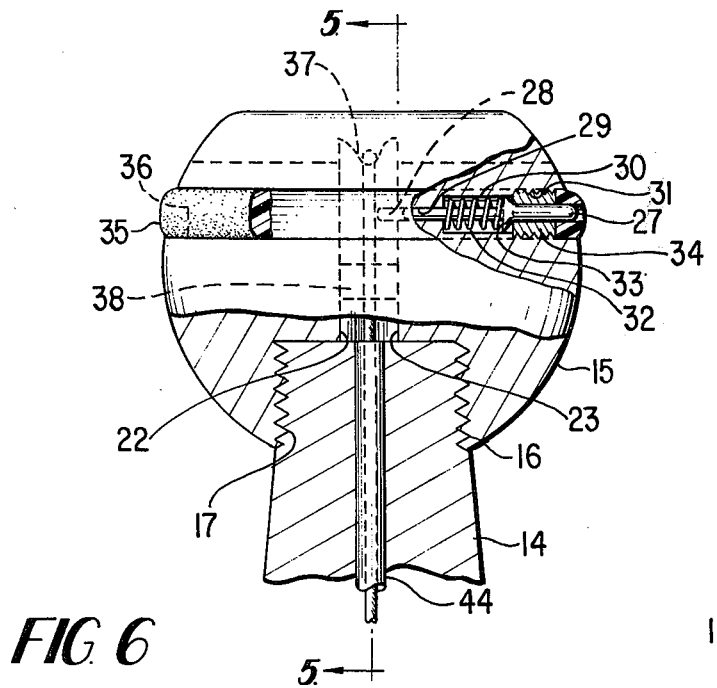
FIG. 6 is an elevational view shown partially in section, of the head end of the invention rotated ninety degrees from the position shown in FIG. 4.
Figure 7:
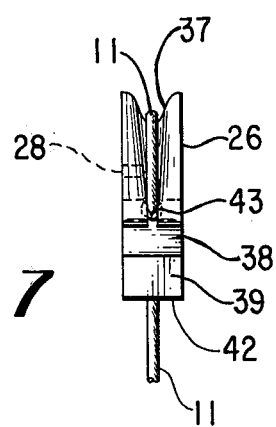
FIG. 7 is a side elevational view of the head part of the invention.

Referring now to the drawings and particularly to FIG. 1, the snare 10 according to this invention is shown with its wire loop 11 engaged about a snake 9 which is shown in phantom lines. The snare 10 includes an elongated pole 12 made up of a handle section 13, an intermediate barrel section 14 and a rounded head section 15 opposite the handle section. The barrel section 14 has external threads 16 at one end for engaging an internally threaded socket 17 in the head section 15, an internally threaded socket 18 at its other end for engaging the external threads 19 at one end of the handle section 13 and a central longitudinal bore 20 extending through the barrel section. The head section 15 has an outwardly open cavity 21 which is defined by parallel side walls 22 and 23, and opposite outwardly diverging side walls 24 and 25. A grooved head or filler block 26 is detachably secured within the cavity 21 by means of a detent pin 27 which engages a transverse detent socket 28 in the head 26. The detent pin 27 is slidably mounted within a transverse cylindrical bore 29 within the head section 15 in alignment with the detent socket 28. The bore 29 opens outwardly into an enlarged coaxial bore 30 in which is seated a coiled compression spring 32. The spring 32 bears against an enlarged shoulder 33 provided on the detent pin 27 and normally biases the pin 27 outwardly of the detent socket 28 to a retracted position as shown in FIG. 6. Outwardly of the enlarged bore 30 is still a further enlarged bore 31 which is internally threaded to threadedly engage a threaded detent pin retainer plug 34. The retainer plug 34 has a cylindrical bore which is aligned coaxially with the detent socket 28 and through which the outer end of the detent pin 27 slidably projects. The detent pin 27 is lockably engaged in the detent socket 28 of the head 26 by manually depressing the outer end of the detent pin 27 until it no longer projects outwardly of the detent pin retainer plug 34 and by rotating the split detent pin locking ring 35 in its annular groove 36 until the gap 37 in the ring is moved away from the detent pin 27 and the locking ring holds the pin 27 depressed.

The head 26 has a peripherial groove 37 extending from a ball receiving slot 38 outwardly along one diverging side wall 39, across the end wall 40 and inwardly along the opposite diverging side wall 41 to the base 42 of the head where the depth of the groove increases to the center of the base. The steel snare wire 11 has a ball 43 affixed to one of its ends, the ball 43 is seated within the slot 38 and the wire 11 is seated within the groove 37. The groove 37 in the area of the slot 38 narrows to a slit which is of a width approximately equal to the diameter of the wire 11 so that the ball 43 will be retained within the slot 43 when the head 26 is locked in the cavity 21 of the head section 15. The end of the wire 11 opposite the fixed ball end extends through a rigid steel tube 44 secured within the central bore 20 of the barrel section 14 and extending into the handle section 13.

Looking now at FIGS. 2 and 3, the handle section 13 is shown provided with a cylindrical piston chamber 46 extending inwardly from the externally threaded end 45 of the handle section to a position just rearward of the trigger guard 47 which projects laterally from the handle section. A piston 48 having a hollow forward cylindrical extension 49 of lesser diameter than the piston 48, and a rearward extension 50, also of lesser diameter than the piston 48, is slidably mounted within the cylindrical chamber 46. Aligned coaxially with the chamber 46 in the handle section 13 is a reduced diameter bore 51 in which the rearward piston extension reciprocates. Along one side of the reduced bore 51 is a linear guideway 52 in which slides a linear piston guide rib 53 which is attached to and extends the full length of the rearward piston extension 50. A trigger notch 54 FIG. 3 is disposed in the guide rib 52 intermediate its ends. The trigger notch has a blunt front edge 54' for latching engagement with a trigger 55 and a rearwardly sloping rear edge 54''. The trigger 55 pivots within the slot 62, cut through the wall of handle section 13, about a pivot pin 61. The trigger 55 is normally biased counterclockwise as viewed in FIGS. 2 and 3 by means of a compression spring 56 seated at one end in a socket 57 at the rear of the trigger 55 and seated at its other end within the cylinder 58. The cylinder 58 has a yoke 59 attached to its outer end which straddles the trigger 55 below the pivot pin 61 and is pivotally connected to the trigger by a pivot pin 60.

The piston 48 and rearward extension 50 are provided with a central bore 63 which terminates in a lateral slot 64 cut radially inwardly from the outer surface of the rearward extension to intersect the central bore 63. The end of the wire 11, opposite the fixed ball end 43, is secured within the bore 63 by means of a set screw 65 which is seated in an internally threaded socket 65' extending perpendicular to the bore 63 and is tightened against the wire to securely hold the wire against slipping. A coiled compression spring 66 is provided within the cylindrical piston chamber 46 between the piston 48 and the inner end of the threaded barrel stock 18. The spring 66 normally biases the piston 48 rearwardly to the uncocked position shown in FIGS. 3 and thus draws the wire 11 tight against the loop head 26.

The snare 10 is shown in its cocked position in FIG. 2 with the piston extension 50 pushed inwardly against the bias of the actuating spring 66 and latched in the cocked position by the trigger 55 engaged in the trigger notch 54. The inward motion of the piston pushes the steel wire 11 forward through the steel guide tube 20 and out through the head section 15 to expand the snare loop as seen at the right of FIG. 2. The person handling the snare 10 can slip the loop of wire 11 over the head of a snake or other small animal, pull the trigger 55 rearwardly to release the trigger from the trigger notch 54 whereupon the actuating spring 66 forces the piston 48 rearwardly and draws the wire loop 11 tight against the snake or small animal. The outer ends of the head 26 and head section 15 are provided with inside curved surfaces 26a and 15a which are pressed against the body of the animal caught by the snare to reduce the possibility of injury to the animal. It will be noted from an examination of FIG. 2 that the rearward end of the steel tube 20 terminates close to the piston 48 within the hollow forward extension 49 when the snare 10 is cocked. This gives the wire 11 greater support and prevents kinking of the wire 11.

The rear end of the handle section 13 is provided with an indented hand grip surface 70 as seen in FIG. 1. The parts of the snare including the handle section 13, the barrel section 14, the head section 15, the head 26 and piston 48 with its extensions 49 and 50 may be readily molded from plastic materials of sufficient rigidity and strength to avoid bending and breakage. The invention is not limited to the method of manufacture and materials other than plastics can be used for making the aforenamed parts.

The wire 11 must be of sufficient rigidity (i.e. stiffness) so that it may be reciprocated by the piston 48 without kinking, yet it must have sufficient flexibility and resiliency so that the loop extending outwardly from the head section 15 may be expanded and contracted repeatedly without breaking. A steel wire has been found to be satisfactory but wires of other materials meeting the aforesaid requirements may also be used.

While in the foregoing there has been described and shown a preferred embodiment of the invention, various modifications and equivalents may be resorted to within the spirit and scope of the invention as claimed.

What is claimed is:

1. A snare for catching fish, frogs, snakes and other small animals comprising an elongated pole having a head section at one end and a handle section at its other end, a bore extending longitudinally through the pole, a snare wire extending through the bore having one end affixed in said head section, grooved guide block means detachably mounted in said head section for guiding said wire to form an expanded loop outwardly of said head section when said wire is pushed through said central bore in the direction of said head section, said handle section having a piston chamber therein in alignment with and opening into said bore, said piston chamber having a forward end in the direction of said head section and an opposite rear end, a piston extension receiving chamber extending rearwardly of said piston chamber through said handle section, a piston reciprocally mounted within said piston chamber from a normal rear uncocked position to a forward cocked position, a rear piston extension reciprocal within said piston extension receiving chamber, means securing the other end of said snare wire to said piston for reciprocating said wire through said bore upon reciprocation of said piston to expand and contract said loop, spring means within said piston chamber for biasing said piston in a direction opposite said head section to contract said loop, trigger means for holding said piston in its cocked position, said piston being normally biased by said spring means to its uncocked condition toward the rear end of said piston chamber with said piston extension projecting outside of said handle, said snare being cocked by pushing said piston extension toward the head section until said piston is held in said cocked position by said trigger means and said loop is expanded.

2. A snare for catching fish, frogs, snakes and other small animals comprising an elongated pole having a head section at one end and a handle section at its other end, a bore extending longitudinally through the pole, a snare wire extending through the bore having one end affixed in said head section, grooved guide block means detachably mounted in said head section for guiding said wire to form an expanded loop outwardly of said head section when said wire is pushed through said central bore in the direction of said head section, said handle section having a piston chamber therein in alignment with and opening into said bore, said piston chamber having a forward end in the direction of said head section and an opposite rear end, a piston extension receiving chamber extending rearwardly of said piston chamber through said handle section, a piston reciprocally mounted within said piston chamber from a normal rear uncocked position to a forward cocked position, a rear piston extension reciprocal within said piston extension receiving chamber, means securing the other end of said snare wire to said piston for reciprocating said wire through said bore upon reciprocation of said piston to expand and contract said loop, spring means within said piston chamber for biasing said piston in a direction opposite said head section to contract said loop, trigger means for holding said piston in its cocked position, said piston being normally biased by said spring means to its uncocked condition toward the rear end of said piston chamber with said piston extension projecting outside of said handle, said snare being cocked by pushing said piston extension toward the head section until said piston is held in said cocked position by said trigger means and said loop is expanded, said bore being lined with a tube for guiding said wire in linear motion, said tube having one end which extends into said piston chamber to a position adjacent said piston in its cocked position thereof.

3. The snare according to claim 2 wherein said piston has a forward cylindrical extension of lesser diameter than said piston, and said spring means comprises a coiled spring surrounding said forward extension and having one end seated against said piston and another end seated against said forward end of said piston chamber.

4. The snare according to claim 2 wherein rear piston extension has a laterally extending linear guide rib and said piston extension receiving chamber has a linear guide groove in its wall for guiding said piston in a linear path.

5. The snare according to claim 4 wherein said guide rib has a trigger notch therein and said trigger means includes a pivoted spring biased trigger which engages said trigger notch to hold said piston in said cocked position.

6. A snare for catching fish, frogs, snakes and other small animals comprising an elongated pole having a head section at one end and a handle section at its other end, a bore extending longitudinally through the pole, a snare wire extending through the bore having one end affixed in said head section, grooved guide block means detachably mounted in said head section for guiding said wire to form an expanded loop outwardly of said head section when said wire is pushed through said central bore in the direction of said head section, said handle section having a piston chamber therein in alignment with and opening into said bore, said piston chamber having a forward end in the direction of said head section and an opposite rear end, a piston extension receiving chamber extending rearwardly of said piston chamber through said handle section, a piston reciprocally mounted within said piston chamber from a normal rear uncocked position to a forward cocked position, a rear piston extension reciprocal within said piston extension receiving chamber, means securing the other end of said snare wire to said piston for reciprocating said wire through said bore upon reciprocation of said piston to expand and contract said loop, spring means within said piston chamber for biasing said piston in a direction opposite said head section to contract said loop, trigger means for holding said piston in its cocked position, said piston being normally biased by said spring means to its uncocked condition toward the rear end of said piston chamber with said piston extension projecting outside of said handle, said snare being cocked by pushing said piston extension toward the head section until said piston is held in said cocked position by said trigger means and said loop is expanded, said head section including an outwardly opening cavity therein for detachably receiving said grooved guide means, and detent means for latching said grooved guide means in said cavity.

7. The snare according to claim 6 wherein said detent means includes a detent socket in said grooved guide means, a detent pin reciprocally mounted in said head section in alignment with said detent socket, spring means normally biasing said detent pin out of engagement with said socket, and movable means for locking and unlocking said detent pin in a position in engagement with said detent socket.

* * * * *